(12) United States Patent
Imazawa et al.

(10) Patent No.: US 9,627,946 B2
(45) Date of Patent: Apr. 18, 2017

(54) LEAD WIRE CONNECTION STRUCTURE OF ROTATING ELECTRIC MACHINE

(75) Inventors: Yoshiro Imazawa, Chiyoda-ku (JP); Kazunori Tanaka, Chiyoda-ku (JP); Ryoichi Sasahara, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 552 days.

(21) Appl. No.: 14/131,479

(22) PCT Filed: Oct. 12, 2011

(86) PCT No.: PCT/JP2011/073381
§ 371 (c)(1),
(2), (4) Date: Jan. 8, 2014

(87) PCT Pub. No.: WO2013/054401
PCT Pub. Date: Apr. 18, 2013

(65) Prior Publication Data
US 2014/0132098 A1    May 15, 2014

(51) Int. Cl.
*H02K 3/00* (2006.01)
*H02K 11/04* (2016.01)
(Continued)

(52) U.S. Cl.
CPC ............ *H02K 11/046* (2013.01); *H02K 3/50* (2013.01); *H02K 5/225* (2013.01); *H02K 19/36* (2013.01); *H02K 3/28* (2013.01); *H02K 2203/03* (2013.01)

(58) Field of Classification Search
CPC .............. H02K 3/02; H02K 3/28; H02K 3/50
See application file for complete search history.

(56) References Cited

U.S. PATENT DOCUMENTS

| 5,682,070 A | 10/1997 | Adachi et al. |
| 2006/0232157 A1* | 10/2006 | Ooiwa ............... H02K 9/06 310/201 |
| 2007/0007843 A1* | 1/2007 | Matsubara ............. H02K 3/02 310/179 |

FOREIGN PATENT DOCUMENTS

| EP | 1248350 A2 | 10/2002 |
| JP | 5-161295 A | 6/1993 |

(Continued)

OTHER PUBLICATIONS

International Search Report of PCT/JP2011/073381, dated Jan. 17, 2012.

(Continued)

*Primary Examiner* — Dang Le
(74) *Attorney, Agent, or Firm* — Sughrue Mion, PLLC; Richard C. Turner (57) ABSTRACT

A lead wire connection structure includes a rectifier that is arranged at the outside or the inside in an axis direction of the brackets so as to rectify AC voltage, which is generated on the stator, to DC voltage; in which, when a number of conductors of a connecting portion, at which lead conductors of the stator winding and the rectifier are connected, is "N" (N is integer and greater than or equal to 2) per one position, conductors, of which number is less than or equal to "N-1" per one position, are connected at the connecting portion, and conductors excepted from the conductors, of which number is less than or equal to "N-1", are welded onto the remaining conductors at a position being nearer the stator winding side than the connecting portion.

6 Claims, 5 Drawing Sheets

(51) Int. Cl.
*H02K 3/50* (2006.01)
*H02K 19/36* (2006.01)
*H02K 5/22* (2006.01)
*H02K 3/28* (2006.01)

(56) References Cited

FOREIGN PATENT DOCUMENTS

| | | |
|---|---|---|
| JP | 9-19119 A | 1/1997 |
| JP | 2006-304436 A | 11/2006 |
| JP | 2007-181396 A | 7/2007 |

OTHER PUBLICATIONS

Communication dated Mar. 30, 2016, from the European Patent Office in counterpart application No. 11874050.5.

* cited by examiner

LEAD WIRE CONNECTION STRUCTURE OF ROTATING ELECTRIC MACHINE

CROSS REFERENCE TO RELATED APPLICATIONS

This application is a National Stage of International Application No. PCT/JP2011/073381 filed Oct. 12, 2011, the contents of all of which are incorporated herein by reference in their entirety.

BACKGROUND OF THE INVENTION

Technical Field

The present invention relates to a lead wire connection structure of a rotating electric machine such as a vehicular alternator, and particularly relates to a connection structure for a stator winding and rectifier of a vehicular rotating electric machine.

Background Art

In general, a stator of a rotating electric machine is configured in such a way that a stator winding is wound around a slot that is formed on a stator core with a predetermined pitch, and then, a lead wire of the stator winding is led from a rear bracket via a circuit board, and is connected to a rectifier, which is attached to the outside of the stator core, by welding the lead wire or fastening the lead wire by a screw or the like, whereby AC voltage generated in the stator winding is rectified to DC voltage so as to be supplied to various electric loads.

Figure 7:
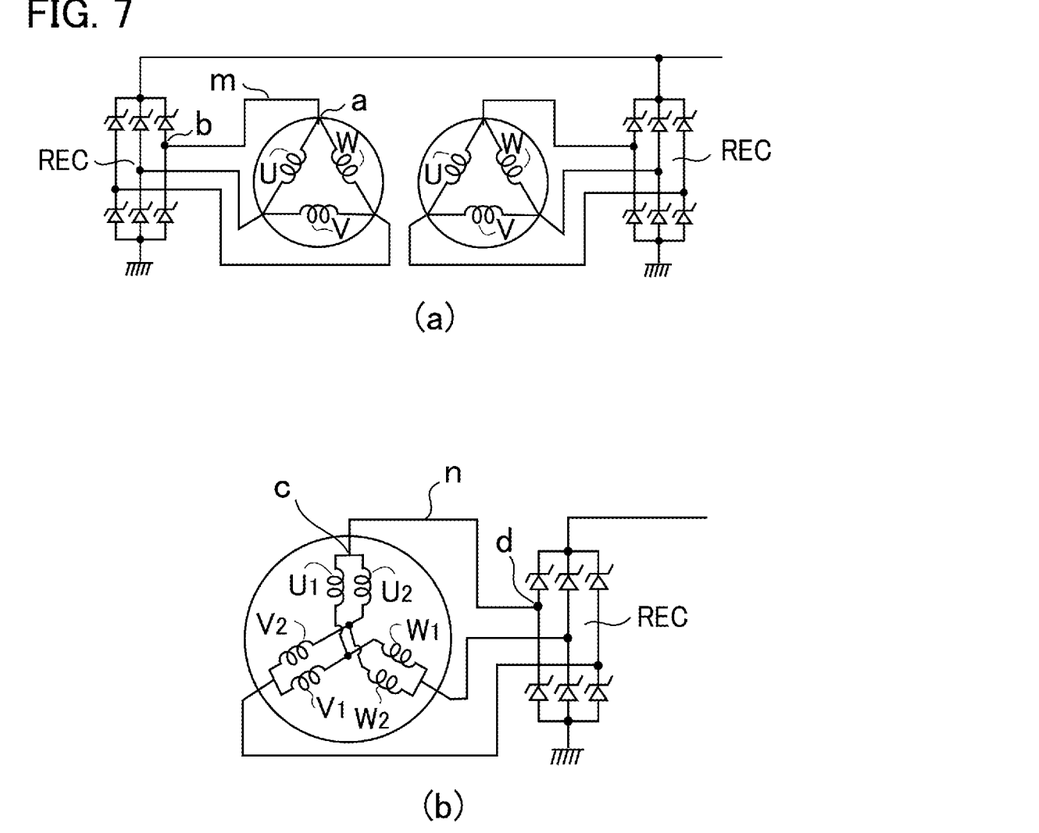
FIG. 7 is an electric circuit diagram illustrating vehicular alternators in which the present invention is applied.

In a vehicular alternator in recent years, there have been many cases in which delta connection or two set of parallel Y connections, which are illustrated in FIG. 7, is adopted, and there has been a case in which a number of conductors, such as lead wires connected to a rectifier, is greater than or equal to two at one position other than a neutral point of the Y connection. For example, in a case of delta connection illustrated in FIG. 7 (a), a lead wire of a U-phase winding and a lead wire of a W-phase winding are temporarily connected each other at an "a"-point, and then, the connected lead wires are connected, via a conductor "m", to a rectifier REC at a "b"-point. At the other connection points, in other words, at a point for mutually connecting lead wires of the U-phase winding and a V-phase winding and another point for mutually connecting lead wires of the V-phase winding and the W-phase winding, the conductors are similarly connected.

Meanwhile, in a case of star connection illustrated in FIG. 7 (b), a lead wire of a U1-winding and a lead wire of a U2-winding, which are configured in parallel, are temporarily connected each other at a "c"-point, and then, the connected lead wires are connected, via a conductor "n", to a rectifier REC at a "d"-point. In addition, at a point for mutually connecting lead wires of the V1-phase winding and a V2-phase winding and another point for mutually connecting lead wires of the W1-phase winding and the W2-phase winding, the conductors are similarly connected. In these cases, in a conventional method, multiple conductors are mutually twisted at the a-point and the c-point, and the conductors are soldered so as to be connected to a rectifier (refer to Patent Document 1). Moreover, in the other conventional method, connecting hardware is attached to conductors, and then, and the conductors are connected to a rectifier by a screw or a welding process (refer to Patent Document 2).

CONVENTIONAL ART DOCUMENT

Patent Document

Patent Document 1: U.S. Pat. No. 6,628,023B1 (FIG. 1)
Patent Document 2: Japanese Patent No. 4252360 (FIG. 1 through FIG. 3)

SUMMARY OF THE INVENTION

Problems to be Solved by the Invention

However, when a conductor is twisted as described above, a length for configuring a twisted portion is required. Moreover, a diameter of the conductor at the twisted portion is greatly increased, so that extra space for connecting a rectifier is sometimes required. Moreover, when the conductor is twisted and connected, the electrical contact is incompletely performed, so that it is general that previous soldering is performed and the conductor is connected, and a working cost and a material cost are increased.

Moreover, in a case where connecting hardware is used, a connection terminal of a rectifier and a screw for fixing the connecting hardware are required, so that a material cost is increased. Furthermore, man-hour for adding terminals increased, so that a working cost is increased. Furthermore, a size of the connecting hardware is greatly increased with respect to an original diameter of a conductor, so that extra space is required when the conductor is connected to the rectifier. Furthermore, a weight of a rotating electric machine is increased in accordance with a connection of the connecting hardware, and the barycenter is shifted to a tip of the lead wire, so that there is a case in which a vibration resistance is deteriorated.

As described above, in a twist connection structure and a connecting hardware structure, which are conventionally adopted, it is required that a material cost and a working cost are increased, and the structures are troubles for miniaturization and price reduction when a rotating electric machine is manufactured. The present invention has been made to solve above-described problems, and an object of the invention is to provide a lead wire connection structure of a rotating electric machine, in which extra space is not required when the lead wire is connected to a rectifier, and a welding work is easily performed, whereby a working cost and a material cost can be reduced.

Means for Solving Problems

A lead wire connection structure of a rotating electric machine according to the present invention includes a housing that is composed of a front bracket and a rear bracket; a rotor that is fixed to a shaft, which is supported between the brackets, so as to be rotatably arranged in the housing; a stator that includes a stator core having an annular shape, which is sandwiched by the front bracket and the rear bracket so as to be arranged in such a way that the stator core surrounds the rotor, and a stator winding which is mounted on the stator core; and a rectifier that is arranged at the outside or the inside in an axis direction of the brackets so as to rectify AC voltage, which is generated on the stator, to DC voltage; wherein, when a number of conductors of a connecting portion, at which lead conductors of the stator winding and the rectifier are connected, is "N" (N is integer and greater than or equal to 2) per one position, conductors, of which number is less than or equal to "N−1" per one position, are connected at the connecting portion, and conductors excepted from the conductors, of which number is less than or equal to "N−1", are welded onto the remaining conductors at a position being nearer the stator winding side than the connecting portion.

Effects of the Invention

The connecting portion for the rectifier is formed only by conductors passed through a circuit board, of which number is less than or equal to "N−1", so that a welding work for the rectifier becomes easy, and a size of the hole of the circuit board can be reduced. Moreover, conductors excepted from the conductors, of which number is less than or equal to "N−1", are welded to the conductors, of which number is less than or equal to "N−1", at midstream, in other words, at a stator winding side near the connecting portion, whereby a size of a guide portion, which is a part of the circuit board, is more reduced, in a circumference direction, in comparison with a case in which N pieces of conductors are arranged in a circumference direction, and a size of a heat sink, which is arranged near the circuit board in the circumference direction, can be enhanced with respect to the reduced size of the guide portion, whereby a whole AC generator is favorably configured.

MODE FOR CARRYING OUT THE INVENTION

Embodiment 1

Figure 1:
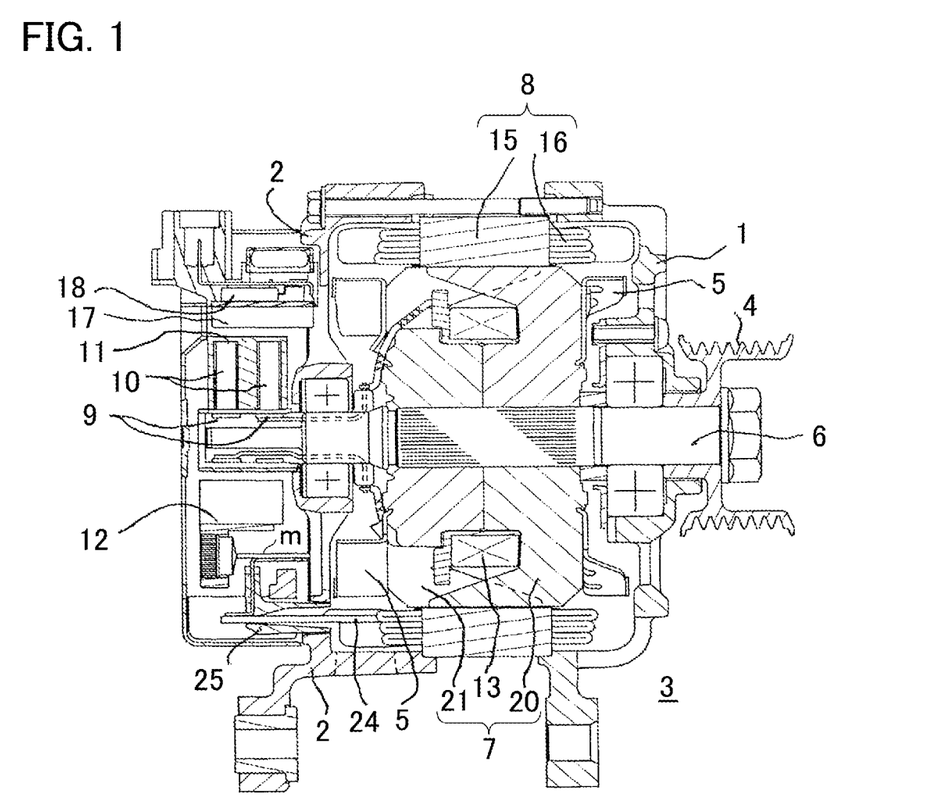
FIG. 1 is a longitudinal cross-sectional view illustrating a vehicular alternator that installs a stator of a rotating electric machine according to Embodiment 1 of the present invention.
Figure 2:
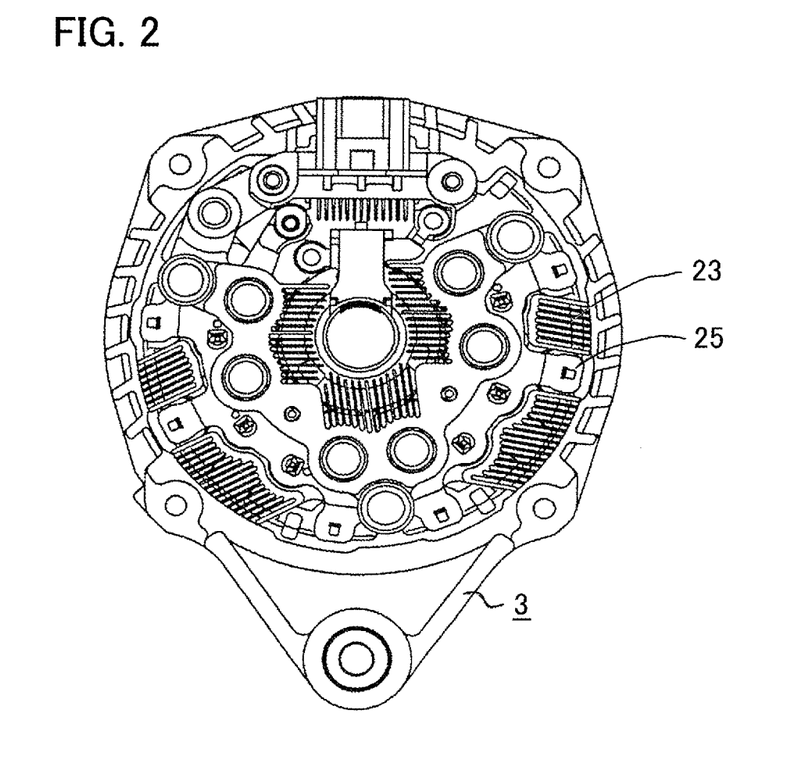
FIG. 2 is a side cross-sectional view illustrating the vehicular alternator according to Embodiment 1.

FIG. 1 is a longitudinal cross-sectional view illustrating a vehicular alternator that installs a stator of a rotating electric machine according to Embodiment 1 of the present invention, and FIG. 2 indicates a side cross-sectional view of the vehicular alternator. In FIG. 1, the vehicular alternator formed as a rotating electric machine includes a housing 3 that is composed of a front bracket 1 and a rear bracket 2, which are made of aluminum; a shaft 6, in which a pulley 4 is fixed to one end portion, that is provided in the housing 3; a Lundell-type rotor 7 that is fixed to the shaft 6; fans 5 which are fixed to both end portion in an axial direction of the rotor 7; and a stator 8 that is fixed to the case 3 in such a way that the stator 8 surrounds the rotor 7.

Moreover, the vehicular alternator further includes a slip ring 9 which is fixed to the other end portion of the shaft 6 at the outside of the rear bracket 2 so as to supply current to the rotor 7; a pair of brushes 10 which slide on a surface of the slip ring 9; a brush holder 11 for installing the brushes 10; a rectifier 12 that is electrically connected to the stator 8 so as to rectify AC voltage, which is generated on the stator 8, to DC voltage; and a regulator 18 that is attached to a heat sink 17, which is fitted to the brush holder 11, so as to regulate level of the AC voltage generated on the stator 8.

Then, the rotor 7 includes a field-magnet winding 13 which passes current so as to generate a magnetic flux; and pair of pole cores 20 and 21 which are provided in such a way that the pole cores cover the field-magnet winding 13 so as to form a magnetic pole by the magnetic flux. The pair of pole cores 20 and 21 is made from iron, and eight pairs of craw pole magnets 22 and 23, in which each of the most outside diameter surfaces has a roughly trapezoidal shape, are stuck to an outer edge portion in a circumferential direction with equiangular pitches, and then, the pole cores are fixed to the shaft 6 in such a way that the magnets 22 and 23 are faced so as to be engaged. Moreover, the stator 8 is composed of a stator core 15 having a cylindrical shape and a stator winding 16 wound around the stator core 15.

Figure 3:
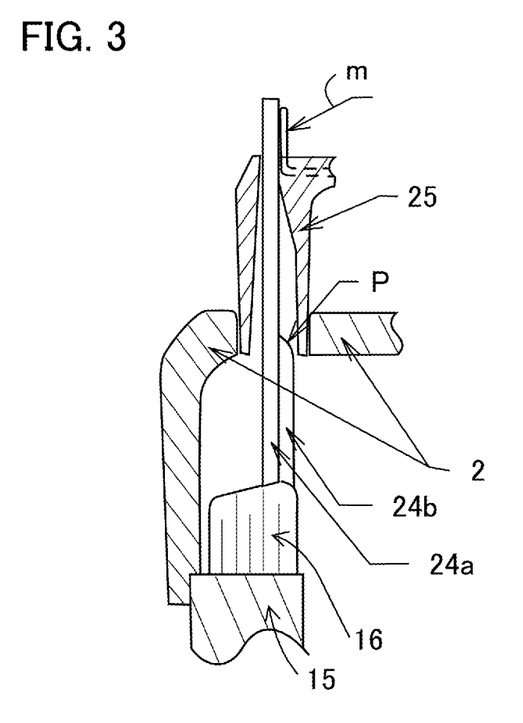
FIG. 3 is an enlarged view of a main portion in FIG. 2.

A lead conductor 24 extended from the stator winding 16 is passed through a hole of a circuit board 25, which is fixed to the rear bracket 2, via the heat sink (refer to FIG. 2), and is led to the outside of the rear bracket 2, and then, the lead conductor 24 is connected to the rectifier 12, which is placed at the outside, via a connecting conductor "m". FIG. 3 is a partially enlarged view illustrating a guided portion of the lead conductor of the stator winding 16. When the lead conductor 24, which is guided from the stator winding 16, includes two lead conductors 24a and 24b, the lead conductors are led in a radial direction in a state where those are stacked, and only one conductor 24a is passed through the circuit board 25 at midstream so as to be connected to the connecting conductor "m" of the rectifier 12 by welding process or the like, and moreover, the other one conductor 24b is welded to the conductor 24a at midstream in the radial direction. In addition, the circuit board 25 is composed of an insulator, and is used for a guide which leads the lead wire to the outside in a state where the connecting conductor "m" for connecting to the rectifier 12 is previously molded and inserted.

By combing the components as described above, a connecting portion for connecting to the rectifier 12 is composed of only the one conductor 24a which is passed through the circuit board 25, so that welding work for welding the connecting portion to the rectifier becomes easier, and the holes of the circuit board 25 become smaller. Moreover, the rotating electric machine is structured in such a way that the other one conductor 24b is welded to the conductor 24a at midstream, in other words, at a position being nearer the stator winding side than the connecting portion, whereby a guide portion of the conductors, which is a part of the circuit board 25, becomes, in a circumferential direction, smaller in comparison with a guide portion in a case where two conductors are arranged in the circumferential direction, and the heat sink 17, which is arranged in a circumferential direction near the circuit board 25, can be greatly structured in accordance with the small guide portion, so that the whole rotating electric machine can be favorably structured (refer to FIG. 2).

Embodiment 2

Figure 4:
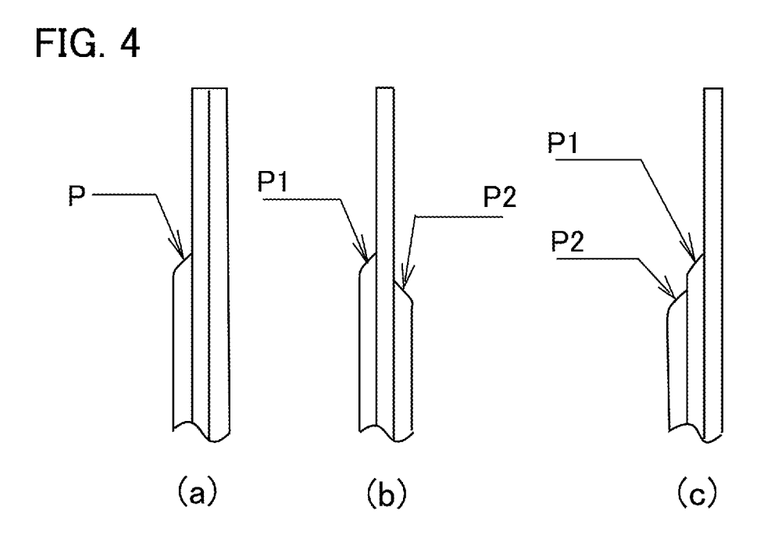
FIG. 4 is a view illustrating a lead wire connection structure of a rotating electric machine according to Embodiment 2 of the present invention.

An applicable example, in which two lead wires for connecting the rectifier are used at one position, are explained in Embodiment 1, whereas an applicable example, in which a rotating electric machine includes lead wires of a stator winding, of which number is greater than or equal to three, is indicated in Embodiment 2, and various applicable examples, in which three lead wires are used, are indicated in FIG. 4. FIG. 4 (*a*) indicates an example in which two lead conductors are led to a connecting portion of a rectifier, and a weld portion "P" is provided at midstream of only the remaining one lead conductor, in other words, at a position being nearer the stator winding side than the connecting portion of the rectifier. FIG. 4 (*b*) and FIG. 4 (*c*) indicate examples in which one lead conductor is led to the connecting portion of the rectifier, and weld portions are provided at midstream of the remaining two conductors. FIG. 4 (*b*) indicate an example of a type in which the remaining two lead conductors are welded onto weld portions (P1 and P2) at right and left sides of one of the lead conductors. FIG. 4 (*c*) indicate an example of a type in which the other one lead conductor is firstly welded onto one of the lead conductors at a weld portion (P1), and the remaining one lead conductor is secondly welded onto the welded lead conductor at a weld portion (P2).

In other words, when a number of conductors of the connecting portion, at which the lead portions of the stator winding and the rectifier are connected, is "N" (N is integer and greater than or equal to 2) per one position, conductors, of which number is less than or equal to "N−1" per one position, are connected at the connecting portion, and conductors excepted from the conductors, of which number is less than or equal to "N−1", are welded onto the remaining other conductors at a position being nearer the stator winding side than the connecting portion.

Embodiment 3

Figure 5:
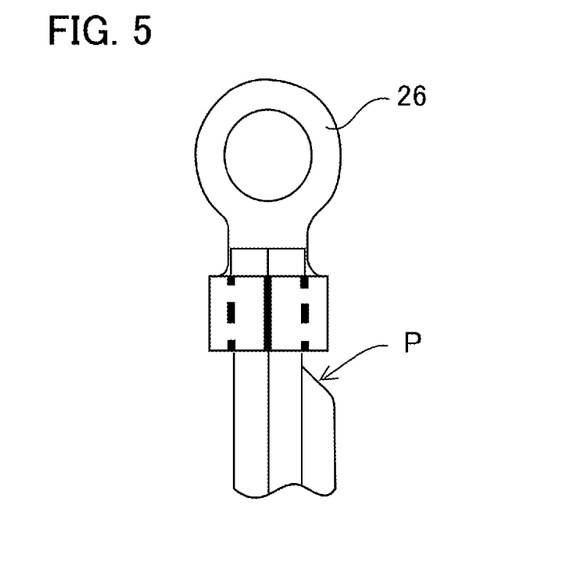
FIG. 5 is a view illustrating a lead wire connection structure of a rotating electric machine according to Embodiment 3 of the present invention.

In a connecting portion for a rectifier, when a material of a terminal of the rectifier is a metal which includes many oxygen constituents such as copper, and the rectifier is connected by TIG welding process or the like, there has been a problem in that a blow hole is caused by the oxygen constituents, and a sufficient welding strength is not obtained. A lead wire connection structure according to Embodiment 3 is applied to these cases, and an aspect, in which connection hardware is also used as illustrated in FIG. 5, is indicated. As the performed aspect of the present invention, connecting hardware 26 is fixed to end portions of two lead wires of a stator winding, which are passed through, for example, a circuit board, and only the remaining one lead wire is welded at midstream, in other words, onto a weld portion "P" at the stator winding side. Because the weld portion "P" is provided, the connecting hardware 26 fastens only two lead wires, and a size of the connecting hardware 26 can be more reduced, whereby there are effects in which a structure of the connecting portion for the rectifier is advanced, for example, a material cost of the terminal is reduced, or wide connecting space for the rectifier is ensured.

Embodiment 4

Figure 6:
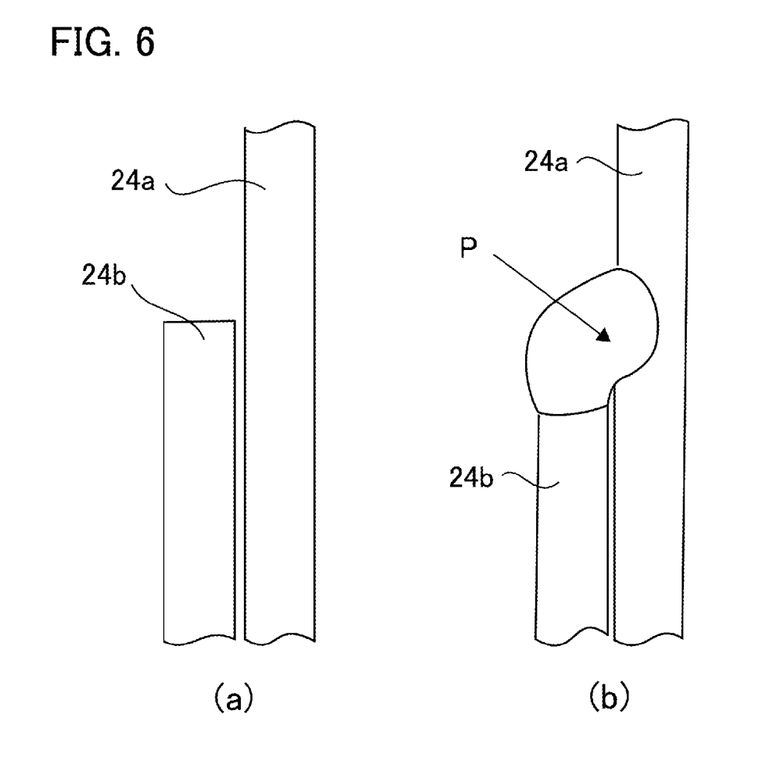
FIG. 6 is a view illustrating a lead wire connection structure of a rotating electric machine according to Embodiment 4of the present invention.

FIG. 6 is a view for explaining the detail welding method described in each of the above-described embodiments, and FIG. 6 (*a*) indicates a state before lead conductors are welded, and FIG. 6 (*b*) indicates a state after the lead conductors are welded. In general, when an arc welding work is performed, a neighborhood of a contact portion of welding objects is targeted, whereas, when a contact portion is indicated by a curved line as indicated in this example, in order to ensure a welding strength, the welding work must be performed in such a way that a junction area, which is at least compatible to a cross-sectional area of a stator winding, is provided. However, there have been problems in that the amount of melted objects is increased and a weld portion is melted and dropped, so that a stable welding work is not usually performed.

Therefore, in the present invention, a tip of the conductor at a short side is melted and welded to a conductor at a long side, whereby a stable welding work can be performed without causing the above-described problem while the junction area, which is at least compatible to the cross-sectional area of the stator winding, is ensured. In the melting and welding work, it is effective for the stable welding work that a ratio of the melted tip of the the conductor at the short side is greater than a ratio of the melted conductor at the side.

In addition, in the above-described embodiments, although the connection method is explained in a case where the rectifier is installed at the outside of the rear bracket, it is needless to say that a similar connecting structure is applied in a case where the rectifier is installed at the inside of the rear bracket.

DESCRIPTION OF THE SYMBOLS

"1" is a front bracket; "2," a rear bracket; "3," a housing; "4," a pulley; "5," a fan; "6," a shaft; "7", a rotor; "8," a stator; "9," a slip ring; "10," brushes; "11," a brush holder; "12," a rectifier; "13," a rotor winding; "15," a stator core; "16," a stator winding; "20 and 21," pole cores; "24," a lead conductor; "25," a circuit board; "26," connecting hardware.

What is claimed is:

1. A lead wire connection structure of a rotary electric machine, comprising:
    a housing that is composed of a front bracket and a rear bracket;
    a rotor that is fixed to a shaft, which is supported between the brackets, so as to be rotatably arranged in the housing;
    a stator that includes a stator core having an annular shape, which is sandwiched by the front bracket and the rear bracket so as to surround the rotor, and a stator winding which is mounted on the stator core; and
    a rectifier that is arranged at the outside or the inside in an axis direction of the brackets so as to rectify AC voltage, which is generated on the stator, to DC voltage,
    wherein a connecting portion, at which lead portions of the stator winding and the rectifier are connected, comprises at least two conductors extending from the stator winding per position,
    wherein at least one conductor of the at least two conductors is connected to the rectifier at the connecting portion, and
    wherein the remaining conductors of the at least two conductors are welded onto the at least one conductor at a position nearer the stator winding than the connecting portion.

2. A lead wire connection structure of the rotary electric machine as recited in claim 1, wherein the at least one conductor is passed through a hole of a circuit board which is provided on the brackets, so as to be connected to the rectifier.

3. A lead wire connection structure of the rotary electric machine as recited in claim 1, wherein the at least conductor is connected to the rectifier via connecting hardware, and the remaining conductors are directly welded onto the remaining conductors at the position nearer the stator winding than the connecting portion.

4. A lead wire connection structure of the rotary electric machine as recited in claim 3, wherein the at least two conductors are mutually connected in a radial direction.

5. A lead wire connection structure of the rotary electric machine as recited in claim 3, wherein the at least two conductors are welded by melting a tip of a short side of the lead conductors and by inlaying the welded tip to a long side of the lead conductors.

6. A lead wire connection structure of the rotary electric machine as recited in claim 5, wherein a melting ratio of the short side of the lead conductors is greater than a melting ratio of the long side of the lead conductors.

\* \* \* \* \*